United States Patent
Wu (10) Patent No.: US 11,129,164 B2
(45) Date of Patent: Sep. 21, 2021

(54) DEVICE AND METHOD FOR HANDLING SYSTEM INFORMATION CHANGE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 17 days.

(21) Appl. No.: 16/274,256

(22) Filed: Feb. 13, 2019

(65) Prior Publication Data
US 2019/0254030 A1 Aug. 15, 2019

Related U.S. Application Data

(60) Provisional application No. 62/630,208, filed on Feb. 13, 2018.

(51) Int. Cl.
| | | |
|---|---|---|
| *H04W 72/04* | (2009.01) | |
| *H04W 4/90* | (2018.01) | |
| *H04W 76/11* | (2018.01) | |
| *H04W 56/00* | (2009.01) | |
| *H04W 24/08* | (2009.01) | |

(Continued)

(52) U.S. Cl.
CPC ......... *H04W 72/0453* (2013.01); *H04W 4/90* (2018.02); *H04W 24/08* (2013.01); *H04W 48/12* (2013.01); *H04W 56/001* (2013.01); *H04W 72/042* (2013.01); *H04W 76/11* (2018.02); *H04W 76/27* (2018.02); *H04W 88/08* (2013.01)

(58) Field of Classification Search
CPC ... H04W 72/0453; H04W 48/12; H04W 4/90; H04W 72/042; H04W 76/11; H04W 56/001; H04W 24/08; H04W 88/08; H04W 76/27
See application file for complete search history.

(56) References Cited

U.S. PATENT DOCUMENTS

| | | | |
|---|---|---|---|
| 2014/0086145 A1* | 3/2014 | Ramkumar | H04L 1/1832 370/328 |
| 2019/0053029 A1* | 2/2019 | Agiwal | H04W 76/27 |
| 2020/0084698 A1* | 3/2020 | Rune | H04W 48/10 |

FOREIGN PATENT DOCUMENTS

WO  WO-2019139985 A1 *  7/2019  ........... H04L 5/0048

OTHER PUBLICATIONS

3GPP TS 36.331 V15.0.1 (Jan. 2018) Technical Specification; 3rd Generation Partnership Project; Technical Specification Group Radio Access Network; Evolved Universal Terrestrial Radio Access (E-UTRA); Radio Resource Control (RRC); Protocol specification (Release 15).

* cited by examiner

*Primary Examiner* — Walter J Divito
(74) *Attorney, Agent, or Firm* — Winston Hsu (57) ABSTRACT

A base station (BS) for handling SI change comprises at least one storage device for storing instructions and at least one processing circuit coupled to the at least one storage device. The at least one processing circuit is configured to execute the instructions stored in the at least one storage device. The instructions comprise broadcasting a plurality of synchronization signal (SS) blocks (SSBs) and a SI block (SIB) in a first bandwidth part (BWP) of a first carrier; communicating with a first communication device in a second BWP of the first carrier; updating a content of the SIB to an updated content, and broadcasting the SIB comprising the updated content in the first BWP; transmitting a SI change notification in the second BWP to the first communication device; and broadcasting the SIB comprising the updated content in the second BWP.

15 Claims, 7 Drawing Sheets

(51) Int. Cl.
*H04W 88/08* (2009.01)
*H04W 76/27* (2018.01)
*H04W 48/12* (2009.01)

DEVICE AND METHOD FOR HANDLING SYSTEM INFORMATION CHANGE

CROSS REFERENCE TO RELATED APPLICATIONS

This application claims the benefit of U.S. Provisional Applications No. 62/630,208 filed on Feb. 13, 2018, which is incorporated herein by reference.

BACKGROUND OF THE INVENTION

1. Field of the Invention

The present invention relates to a device and a method used in a wireless communication system, and more particularly, to a device and a method of handling a handover system information (SI) change.

2. Description of the Prior Art

In the 3rd Generation Partnership Project (3GPP) standard, a base station (BS) is allowed to broadcast system information (SI) only in an initial bandwidth part (BWP). If a content of the SI is changed, a communication device in a different BWP switches to the initial BWP to receive the SI.

SUMMARY OF THE INVENTION

The present invention therefore provides a communication device for handling a SI change to solve the above-mentioned problem.

A base station (BS) for handling SI change comprises at least one storage device for storing instructions and at least one processing circuit coupled to the at least one storage device. The at least one processing circuit is configured to execute the instructions stored in the at least one storage device. The instructions comprise broadcasting a plurality of synchronization signal (SS) blocks (SSBs) and a SI block (SIB) in a first bandwidth part (BWP) of a first carrier; communicating with a first communication device in a second BWP of the first carrier; updating a content of the SIB to an updated content, and broadcasting the SIB comprising the updated content in the first BWP; transmitting a SI change notification in the second BWP to the first communication device; and broadcasting the SIB comprising the updated content in the second BWP.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
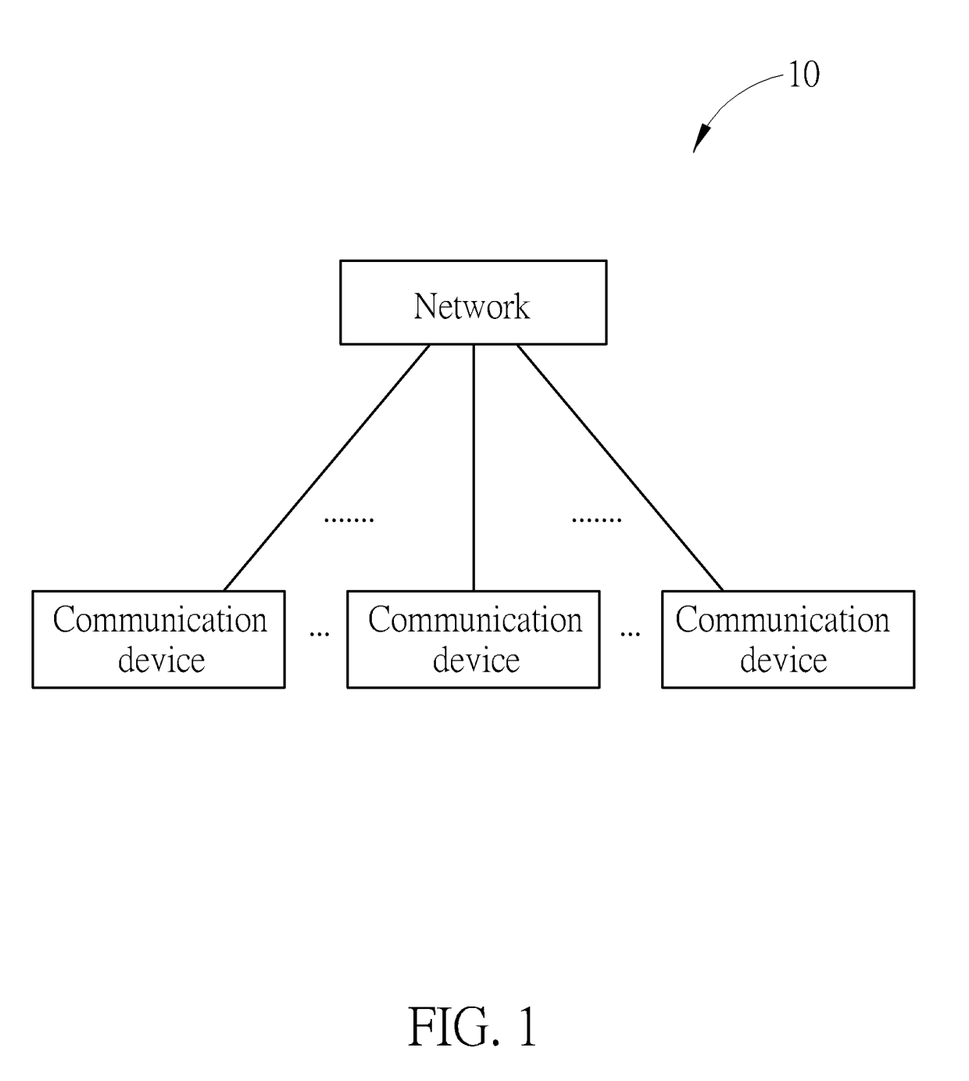
FIG. 1 is a schematic diagram of a wireless communication system according to an example of the present invention.

In FIG. 1, a network and communication devices are simply utilized for illustrating the structure of a wireless communication system 10. Practically, the network includes at least one of a new radio (NR) network and a sixth generation (6G) network. The 6G radio communication technology may employ orthogonal frequency-division multiplexing (OFDM) or non-OFDM, a wider bandwidth (e.g., 1 GHz, 2 GHz or 5 GHz) and a transmission time interval (TTI) shorter than 1 ms (e.g., 1, 2, 3 or 4 OFDM symbols, 100, or 200 us) for communicating between the communication devices and the 6G BS.

A communication device may be a user equipment (UE), a mobile phone, a laptop, a tablet computer, an electronic book, a portable computer system, a vehicle, or an aircraft. In addition, the network and the communication device can be seen as a transmitter or a receiver according to direction of transmission (i.e., transmission direction), e.g., for an uplink (UL), the communication device is the transmitter and the network is the receiver, and for a downlink (DL), the network is the transmitter and the communication device is the receiver.

Figure 2:
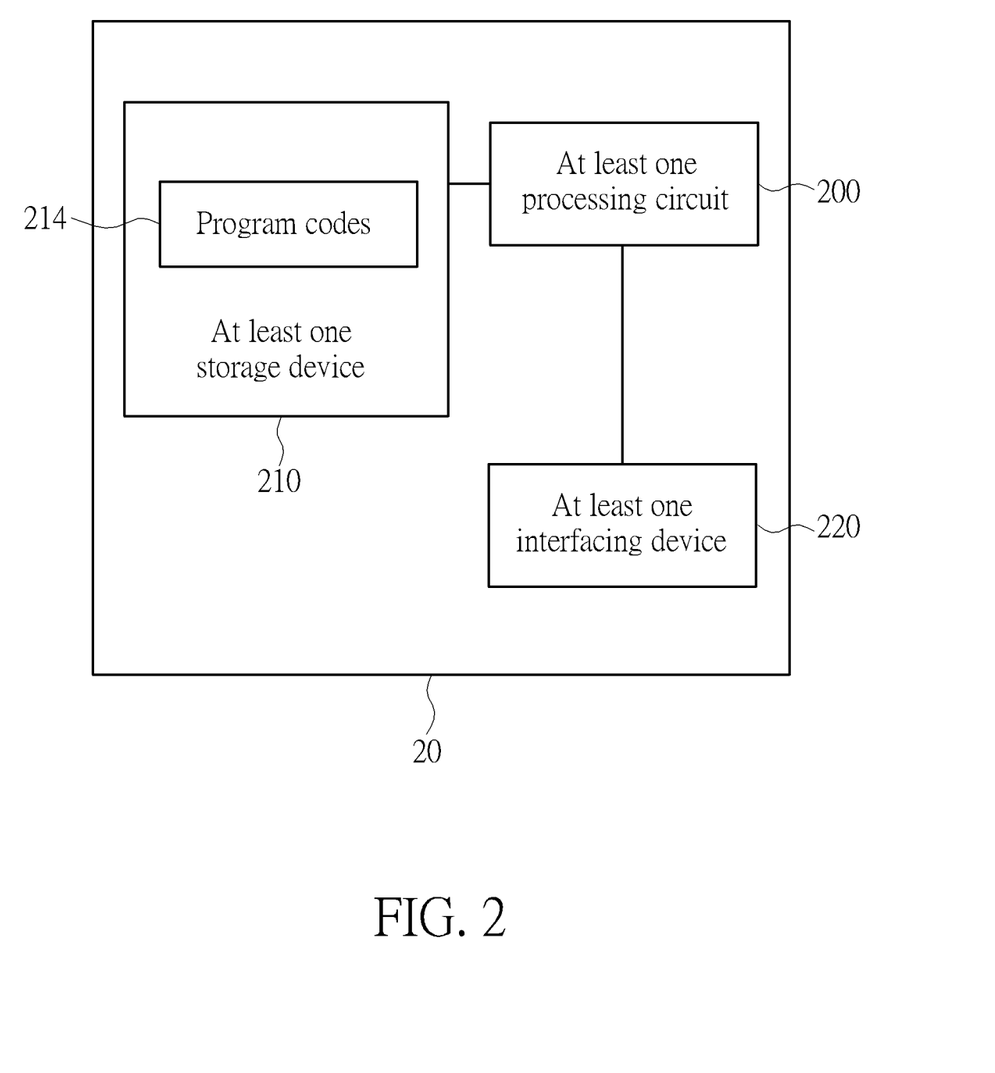
FIG. 2 is a schematic diagram of a communication device according to an example of the present invention.

In FIG. 2, a communication device 20 may be a communication device or the network shown in FIG. 1, but is not limited herein. The communication device 20 may include at least one processing circuit 200 of which each may be a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 includes at least one transceiver used to transmit and receive signals (e.g., data, messages and/or packets) according to processing results of the at least one processing circuit 200.

Figure 3:
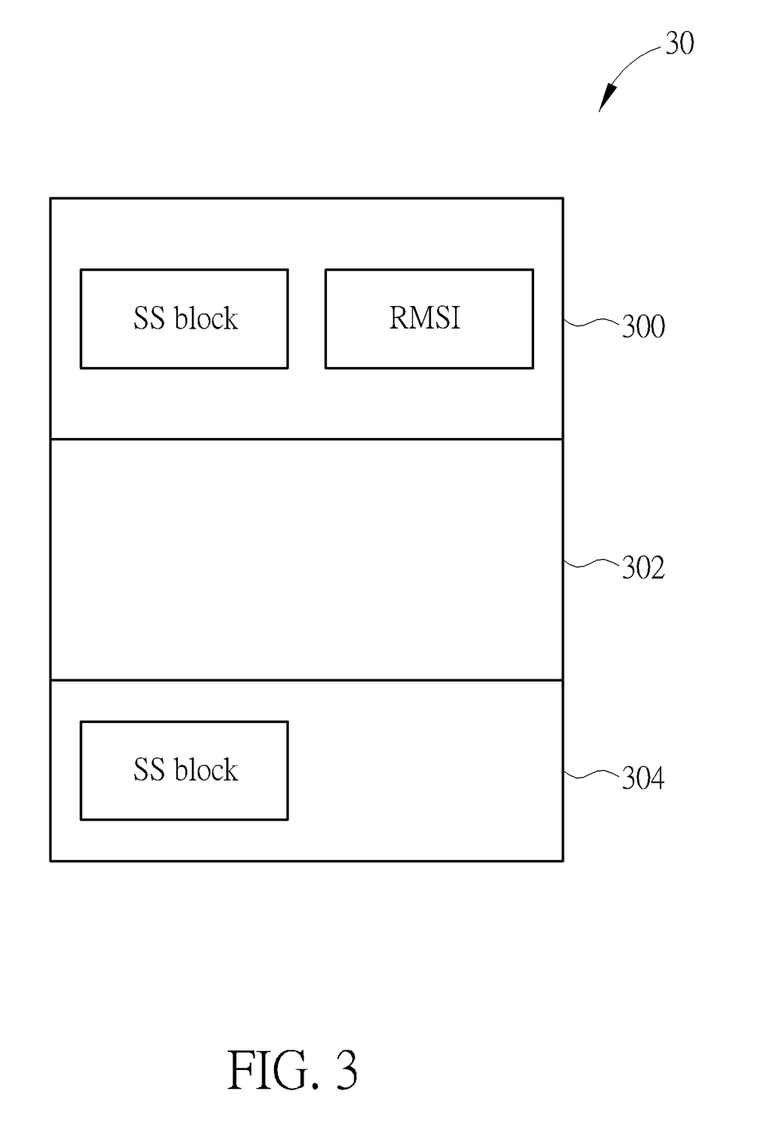
FIG. 3 is a schematic diagram of bandwidth parts (BWPs) in a system bandwidth according to an example of the present invention.

FIG. 3 is an example of bandwidth parts (BWPs) in a system bandwidth 30 according to an example of the present invention. A UE communicates with a BS via a DL BWP in a DL carrier of a cell and a UL BWP in a UL carrier of an UL BWP. The DL BWP may belong one of three types of BWPs as shown in FIG. 3. The UL BWP may belong one of three types of BWPs as shown in FIG. 3. The DL carrier may have one or more BWPs in addition to the DL BWP. The UL and DL BWPs may not be overlapped if the DL and UL carriers are Frequency Division Duplex (FDD) carriers. The UL and DL BWPs may be completely or partially overlapped if the DL and UL carriers are the same Time Division Duplex (TDD) carrier. The BWP 300 with a synchronization signal (SS) block (SSB) and a remaining system information (RMSI) is the first type of BWP. The BWP 302 without the SSB and the RMSI is the second type of BWP. The BWP 304 with the SSB but without the RMSI is the third type of BWP. The SSB may comprise a primary SS (PSS), a secondary SS (SSS) and a physical broadcast channel (PBCH). A DL carrier may have at least one BWP of which each is one of the three types. A UL carrier may have at least one BWP of which each is the second type of BWP.

In the following examples, a UE is used for representing a communication device in FIG. 1, to simplify the illustration of the examples.

Figure 4:
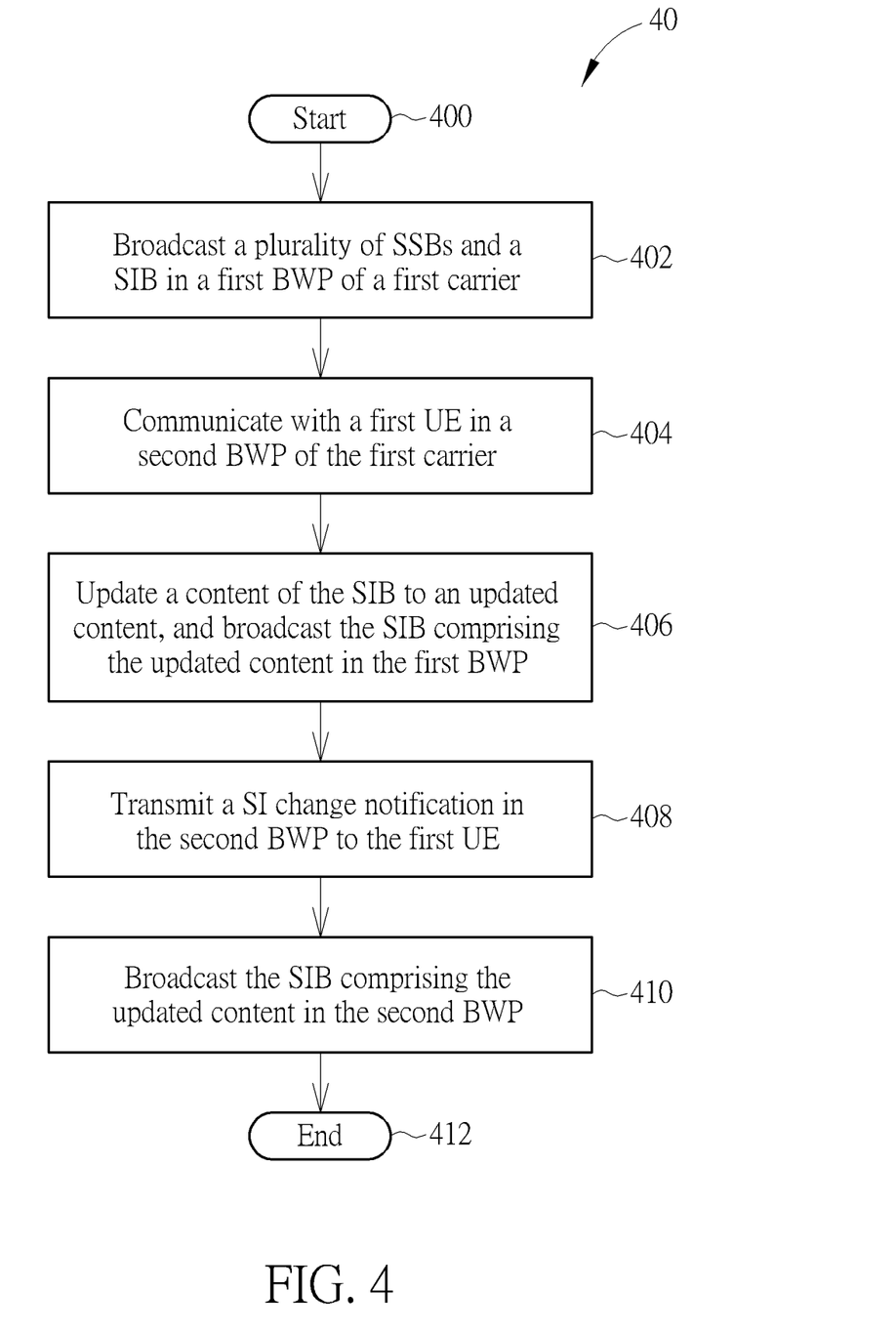
FIG. 4 is a flowchart of a process according to an example of the present invention.

A process 40 in FIG. 4 is utilized in a BS to handle SI change, and includes the following steps:

Step 400: Start.

Step 402: Broadcast a plurality of SSBs and a SI block (SIB) in a first BWP of a first carrier.

Step 404: Communicate with a first UE in a second BWP of the first carrier.

Step 406: Update a content of the SIB to an updated content, and broadcast the SIB comprising the updated content in the first BWP.

Step 408: Transmit a first SI change notification in the second BWP to the first UE.

Step 410: Broadcast the SIB comprising the updated content in the second BWP.

Step 412: End.

According to the process 40, before or after updating the content of the SIB to the updated content, the BS notifies the first UE in the second BWP with the first SI change notification. Thus, ongoing communications between the UE and the BS are not interrupted due to that the UE does not tune its receiver to the first BWP to receive the updated content of the SIB.

Figure 5:
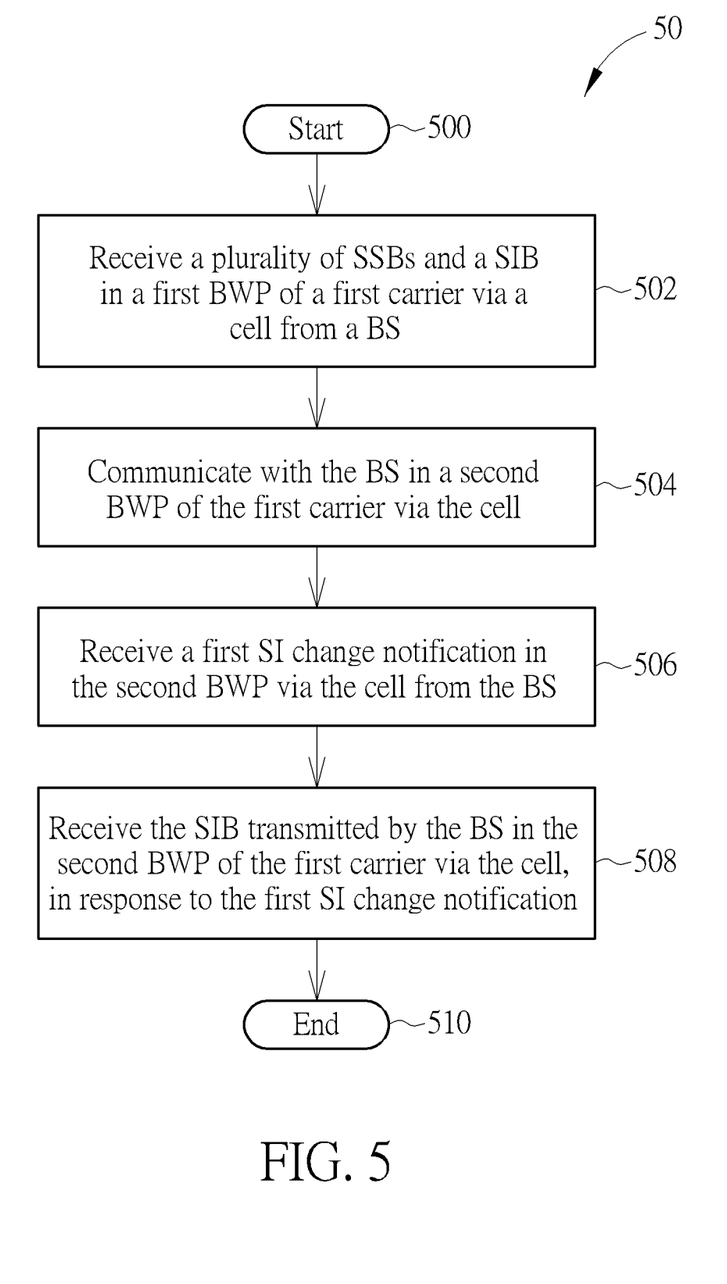
FIG. 5 is a flowchart of a process according to an example of the present invention.

A process 50 in FIG. 5 is utilized in a first UE to handle SI change, and includes the following steps:

Step 500: Start.

Step 502: Receive a plurality of SSBs and a SIB in a first BWP of a first carrier via a cell from a BS.

Step 504: Communicate with the BS in a second BWP of the first carrier via the cell.

Step 506: Receive a first SI change notification in the second BWP via the cell from the BS.

Step 508: Receive the SIB transmitted by the BS in the second BWP of the first carrier via the cell, in response to the first SI change notification.

Step 510: End.

According to the process 50, the first UE does not retune its receiver to the first BWP to acquire the SIB in response to the first SI change notification. The first UE's ongoing service is not interrupted due to the retuning.

Realizations of the processes 40 and 50 are not limited to the above description. The following examples may be applied to the processes 40 and 50.

In one example, each of the plurality of SSBs includes a first master information block (MIB). In one example, the BS transmits the first SI change notification in the first BWP to a second UE. In one example, each of the plurality of SSBs includes a PSS and a SSS. The BS generates the PSS or the SSS according to a physical cell identity (PCI). The first UE and the second UE derive the PCI from the PSS or the SSS.

In one example, the BS broadcasts the SIB including the updated content in the second BWP for a while, and then stops broadcasting the SIB in the second BWP. In one example, the BS broadcasts the first SI change notification in the second BWP for a while, and then stops broadcasting the first SI change notification in the second BWP.

In one example, the BS periodically broadcasts the SIB in the first BWP and in the second BWP with different periods.

In one example, a set of physical DL control channel (PDCCH) candidates for a UE to monitor is defined in terms of PDCCH search spaces. A search space may be a common search space or a UE-specific search space. In one example, the BS broadcasts a first PDCCH periodically in the first BWP in a first PDCCH search space, to indicate the second UE to receive a first physical DL shared channel (PDSCH) transmission comprising the SIB in the first BWP. The second UE receives the SIB in the first BWP by monitoring the first PDCCH search space. In one example, the BS broadcasts a second PDCCH periodically in the second BWP in a second PDCCH search space, to indicate the first UE to receive a second PDSCH transmission comprising the SIB in the second BWP. The first UE receives the second PDCCH in the second BWP by monitoring the second PDCCH search space.

In one example, the first PDCCH search space in the first BWP used by the second UE is a common search space. The second PDCCH search space in the second BWP used by the first UE is a UE-specific search space.

In one example, the first PDCCH search space is configured in the first MIB. The second UE receives the first MIB to obtain a configuration of the first PDCCH search space. The second UE receives the SIB in the first BWP by monitoring the first PDCCH search space. In one example, the second PDCCH search space is configured in a dedicated radio resource control (RRC) message (e.g., RRC reconfiguration message) transmitted to the first UE by the BS (e.g., in the first BWP or in the second BWP). In one example, the second PDCCH search space is configured in a second MIB broadcast by the BS in the second BWP. The first UE acquires the second MIB in response to the first SI change notification to obtain a configuration of the second PDCCH search space. The BS configures the second PDCCH search space in the second MIB to broadcast the SIB including the updated content. The BS updates the second MIB by adding the configuration of the second PDCCH search space to the second MIB, and broadcasts the updated second MIB when determining to broadcast the SIB including the updated content.

In one example, the first UE monitors a PDCCH in the second PDCCH search space in the second BWP by a radio network temporary identifier (RNTI) (e.g., SI-RNTI) to acquire the SIB. If the first UE finds the RNTI on the PDCCH, the first UE receives a PDSCH transmission including the SIB in the second BWP according to a DL assignment on the PDCCH.

In one example, the BS broadcasts a SIB type 1 (SIB1) comprising a scheduling information in the first BWP. The second UE receives the SIB1 in the first BWP in response to a second SI change notification. The second UE obtains the scheduling information from the SIB1 and acquires the SIB in the first BWP according to the scheduling information. The BS broadcasts the second SI change notification in the first BWP for a while, and then stops broadcasting the second SI change in the first BWP. In one example, the BS does not broadcast a SIB1 including scheduling information for the SIB, in the second BWP. The first UE just acquires the SIB in the second PDCCH search space as described above.

In one example, the BS starts broadcasting the SIB1 including the scheduling information for the SIB in the second BWP for a while, when determining to broadcast the SIB including the updated content. The BS stops broadcasting the SIB1 in the second BWP after the while or when determining not broadcasting (or transmitting) the SIB in the second BWP. The first UE receives the SIB1 in response to the first SI change notification. The first UE obtains the scheduling information from the SIB1 in the second BWP and acquires the SIB according to the scheduling information in the second BWP.

In one example, the scheduling information includes system time (e.g., system frame number or subframe number) or an offset and periodicity about transmission of the SIB including the updated content.

In one example, the BS transmits (or broadcasts) the second SI change notification in the first BWP to the second UE while transmitting the first SI change notification. When the second UE receives the second SI change notification in the first BWP, the second UE acquires the SIB in the first BWP in response to the second SI change notification. The second UE monitors a PDCCH in the first PDCCH search space in the first BWP by the RNTI (e.g., SI-RNTI). If the second UE finds the RNTI on the PDCCH, the second UE receives a PDSCH transmission including the SIB in the first BWP according to a DL assignment on the PDCCH.

In one example, the SIB is a SIB X, wherein X is a positive integer (e.g., one of the integers 1-30). The first SI change notification and the second SI change notification are the same or different.

Figure 6:
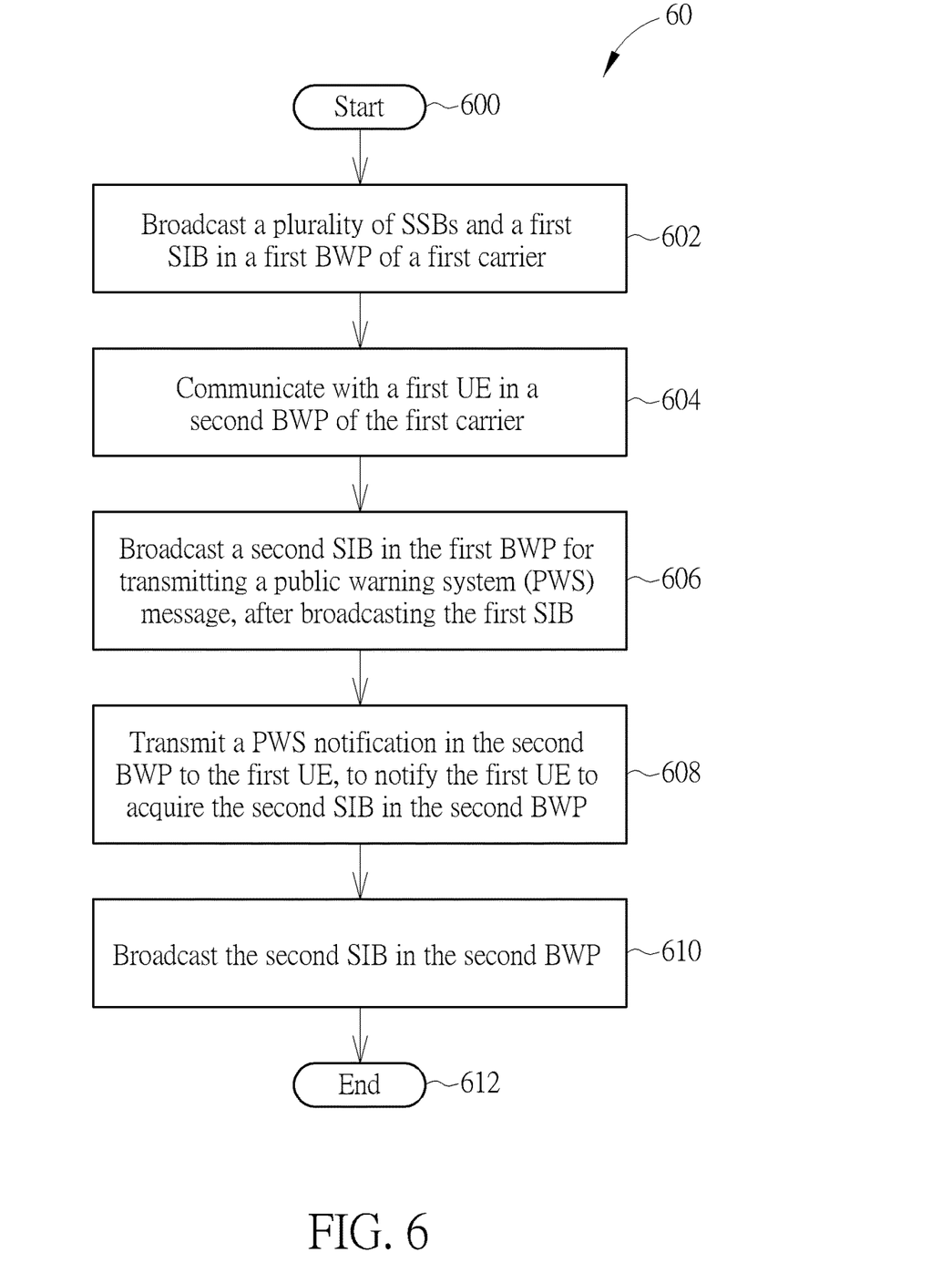
FIG. 6 is a flowchart of a process according to an example of the present invention.

A process 60 in FIG. 6 is utilized in a BS to handle SI change, and includes the following steps:

Step 600: Start.

Step 602: Broadcast a plurality of SSBs and a first SIB in a first BWP of a first carrier.

Step 604: Communicate with a first UE in a second BWP of the first carrier.

Step 606: Broadcast a second SIB in the first BWP for transmitting a public warning system (PWS) message, after broadcasting the first SIB.

Step 608: Transmit a PWS notification in the second BWP to the first UE, to notify the first UE to acquire the second SIB in the second BWP.

Step 610: Broadcast the second SIB in the second BWP.

Step 612: End.

According to the process 60, before or after broadcasting the second SIB for transmitting the PWS message, the BS notifies the first UE in the second BWP with the PWS notification.

Figure 7:
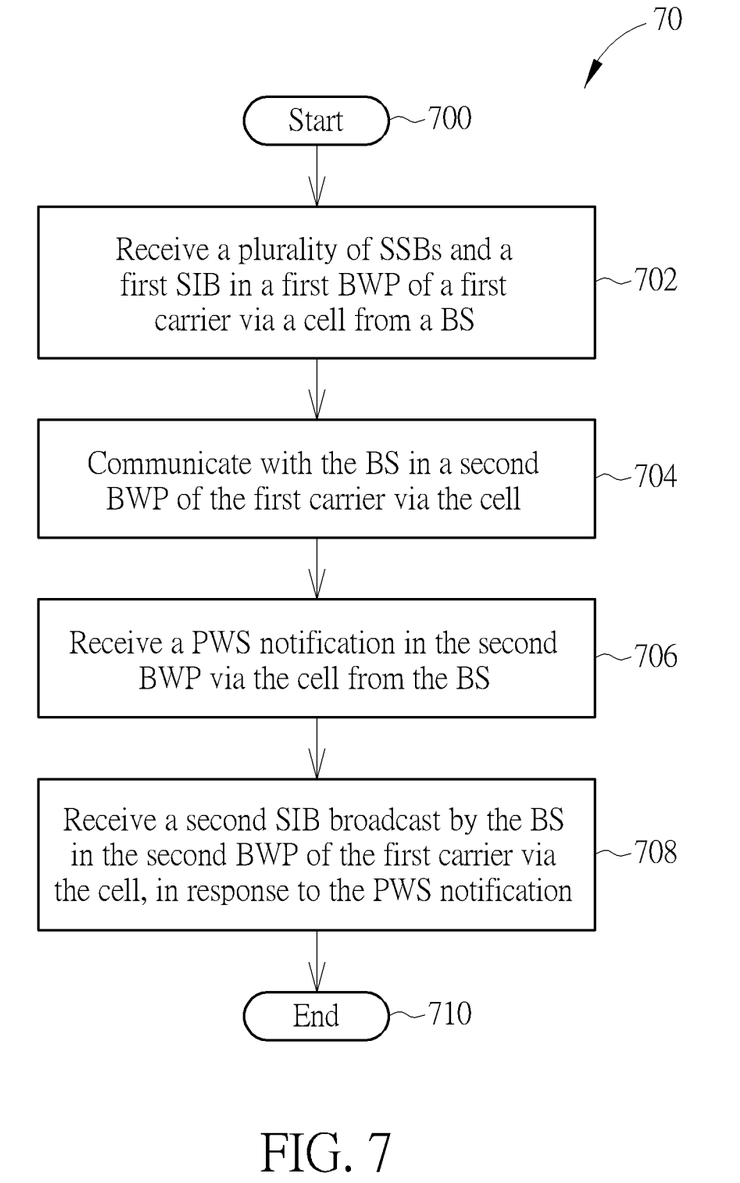
FIG. 7 is a flowchart of a process according to an example of the present invention.

A process 70 in FIG. 7 is utilized in a first UE to handle SI change, and includes the following steps:

Step 700: Start.

Step 702: Receive a plurality of SSBs and a first SIB in a first BWP of a first carrier via a cell from a BS.

Step 704: Communicate with the BS in a second BWP of the first carrier via the cell.

Step 706: Receive a PWS notification in the second BWP via the cell from the BS.

Step 708: Receive a second SIB broadcast by the BS in the second BWP of the first carrier via the cell, in response to the PWS notification.

Step 710: End.

According to the process 70, the first UE does not retune its receiver to the first BWP to acquire the PWS message in response to the PWS notification. Thus, the first UE's ongoing service is not interrupted due to the retuning.

Realizations of the processes 60 and 70 are not limited to the above description. The following examples may be applied to the processes 60 and 70.

In one example, the BS transmits the PWS notification in the first BWP to a second UE.

In one example, the BS broadcasts the second SIB in the second BWP for a while, and then stops broadcasting the second SIB in the second BWP. The BS broadcasts the PWS notification in the second BWP for a while, and then stops broadcasting the second SIB in the second BWP. In another example, the BS broadcasts the second SIB in the first BWP for a while, and then stops broadcasting the second SIB in the first BWP. The BS broadcasts the PWS notification in the first BWP for a while, and then stops broadcasting the PWS notification in the first BWP.

In one example, the BS periodically broadcasts the second SIB in the first BWP and in the second BWP with different periods. The BS may not broadcast the first SIB in the second BWP.

In one example, the BS broadcasts a first PDCCH periodically in the first BWP in a first PDCCH search space, to indicate the second UE to receive a first PDSCH transmission comprising the second SIB in the first BWP. The second UE receives the second SIB in the first BWP by monitoring the first PDCCH search space. In one example, the BS broadcasts a second PDCCH periodically in the second BWP in a second PDCCH search space, to indicate the first UE to receive a second PDSCH transmission comprising the second SIB in the second BWP. The first UE receives the second PDCCH in the second BWP by monitoring the second PDCCH search space. Examples of the processes 40 and 50 for configuring the first and second PDCCH search space can be referred for the processes 60 and 70.

In one example, the first UE monitors a PDCCH in the second PDCCH search space in the second BWP by a RNTI (e.g., SI-RNTI) to acquire the SIB. If the first UE finds the RNTI on the PDCCH, the first UE receives a PDSCH transmission including the second SIB in the second BWP according to a DL assignment on the PDCCH.

In one example, the BS broadcasts a SIB1 comprising a scheduling information in the first BWP. The second UE receives the SIB1 in the first BWP in response to the PWS notification. The second UE obtains the scheduling information from the SIB1 and acquires the second SIB in the first BWP according to the scheduling information. The first SIB may or may not be the SIB 1.

In one example, the BS does not broadcast a SIB1 including the scheduling information for the second SIB, in the second BWP. The first UE just acquires the second SIB in the second PDCCH search space as described above.

In one example, the BS starts broadcasting the SIB1 including the scheduling information for the second SIB in the second BWP for a while, when determining to broadcast the second SIB. The BS stops broadcasting the SIB1 in the second BWP after the while or when determining to stop broadcasting (or transmitting) the second SIB in the second BWP. The first UE receives the SIB1 in response to the PWS notification. The first UE obtains the scheduling information from the SIB1 in the second BWP, and acquires the second SIB according to the scheduling information in the second BWP.

In one example, the scheduling information includes system time (e.g., system frame number or subframe number) or an offset and periodicity about transmission of the second SIB.

In one example, the BS transmits (or broadcasts) the PWS notification in the first BWP to the second UE while transmitting the PWS notification in the second BWP. When the second UE receives the PWS notification in the first BWP, the second UE acquires the second SIB in the first BWP in response to the PWS notification. The second UE monitors a PDCCH in the first PDCCH search space in the first BWP by the RNTI (e.g., SI-RNTI). If the second UE finds the RNTI on the PDCCH, the second UE receives a PDSCH transmission including the second SIB in the first BWP according to a DL assignment on the PDCCH.

In one example, the BS broadcast the second SIB in the first BWP to the second UE when transmitting/broadcasting the second SIB in the second BWP.

In one example, the SIB is a SIB X, wherein X is a positive integer (e.g., one of the integers 3-30). The PWS notification in the first BWP may be replaced by the second SI change notification in the first BWP or the first SI change notification in the second BWP described in the processes 40 and 50.

In one example, the PWS message is an earthquake and tsunami warning system (ETWS) message, a commercial mobile alert service (CMAS) message, an European Alert (EU-Alert) message or a key personnel update system (KPUS) message. The second SIB includes the PWS message or a segment of the PWS message.

Examples of the processes 40 and 50 may be applied to the processes 60 and 70. The following examples can be applied to any of the processes 40-70.

In one example, the first BWP and the second BWP belong to a cell of the BS. The first BWP and the second BWP may or may not be overlapped. The first BWP may be an initial BWP and the second BWP may be a BWP other than the initial BWP.

In one example, the BS transmits the SI change notification or the PWS notification described above in a paging message or in a specific message for the SI change notification. The BS transmits the SI change notification or the PWS notification described above in a paging channel, a broadcast channel or in a control channel.

In one example, the first UE receives the plurality of SSBs or the SIB (not updated yet) in the first BWP of the first carrier before receiving the first SI change notification or receiving the PWS notification. The second UE receives the plurality of SS blocks and the SIB (not updated yet) in the first BWP of the first carrier before receiving the second SI change notification or the PWS notification. The first UE or the second UE transmits a RRC Connection Request message in the first BWP (i.e., the first BWP is a time-division duplex (TDD) BWP and the first carrier is a TDD carrier) or in an UL carrier or an UL BWP associated to the first BWP. The first UE or the second UE receives a RRC Connection Setup message in the first BWP from the BS, wherein the RRC Connection Setup message responds the RRC Connection Request message and configures a signaling radio bearer (SRB). The first UE and the second UE transmits a RRC Connection Setup Complete message on the SRB to the BS in the first BWP or in the UL carrier or an UL BWP associated to the first BWP. In one example, the BS transmits at least one of a first RRC message on the SRB, a Medium Access Control (MAC) control element (CE) and a PDCCH command in the first BWP to the first UE, wherein the at least one of the first RRC message, the MAC CE and the PDCCH command configures and/or activates the second BWP to the first UE. The BS transmits none of the at least one of the first RRC message, the MAC CE and the PDCCH command.

In one example, the BS transmits data (e.g., a PDCCH or a MAC protocol data unit (PDU)) in the second BWP to the first UE when configuring/activating the second BWP to the first UE. In one example, the first UE transmits data (e.g., a physical UL shared channel (PUSCH) or a MAC PDU) in the second BWP, an UL carrier or an UL BWP to the BS. The UL carrier or the UL BWP is configured by the first RRC message or associated to the second BWP.

In one example, the first UE transmits a first RRC response message to the BS in response to the first RRC message. In one example, the first UE transmits the first RRC response message in the first BWP, the UL carrier or the UL BWP associated to the first BWP since the BS may have not activated the second BWP and/or the UL carrier or the UL BWP associated to the second BWP yet. In one example, the first UE transmits the first RRC response message in the second BWP or the UL carrier or the UL BWP to the BS if the BS has activated the second BWP and/or the UL carrier or the UL BWP associated to the second BWP (e.g., by the PDCCH command). The first RRC message is a RRC Reconfiguration message and the first RRC response message may be a RRC Reconfiguration Complete message.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the BS notifies the UE in a BWP with a SI change notification or a PWS notification such that the UE can acquire the SIB including the updated content or the PWS message in the BWP. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A base station (BS) for handling system information (SI) change, comprising:
    at least one storage device; and
    at least one processing circuit, coupled to the at least one storage device, wherein the at least one storage device stores instructions, and the at least one processing circuit is configured to execute the instructions of:
    broadcasting a plurality of synchronization signal (SS) blocks (SSBs) and a SI block (SIB) in a first bandwidth part (BWP) of a first carrier;
    communicating with a first communication device in a second BWP of the first carrier;
    updating a content of the SIB to an updated content, and broadcasting the SIB comprising the updated content in the first BWP;
    transmitting a SI change notification in the second BWP to the first communication device; and
    broadcasting SSBs and the SIB comprising the updated content in the second BWP.

2. The BS of claim 1, wherein the first BWP and the second BWP belong to a cell of the BS.

3. The BS of claim 1, wherein the instructions further comprise:
    transmitting the SI change notification to a second communication device in the first BWP.

4. The BS of claim 1, wherein the instructions further comprise:
broadcasting a physical downlink (DL) control channel (PDCCH) periodically in the second BWP in a PDCCH search space, to indicate the first communication device to receive a physical DL shared channel (PDSCH) transmission comprising the SIB in the second BWP.

5. The BS of claim 1, wherein the BS periodically broadcasts the SIB in the first BWP and in the second BWP with different periods.

6. A communication device for handling system information (SI) change, comprising:
at least one storage device; and
at least one processing circuit, coupled to the at least one storage device, wherein the at least one storage device stores instructions, and the at least one processing circuit is configured to execute the instructions of:
receiving a plurality of synchronization signal (SS) blocks (SSBs) and a SI block (SIB) in a first bandwidth part (BWP) of a first carrier from a base station (BS);
communicating with the BS in a second BWP of the first carrier;
receiving a dedicated radio resource control (RRC) message configuring a physical downlink control channel (PDCCH) search space, from the BS;
receiving a physical downlink control channel (PDCCH) in the second BWP by monitoring a PDCCH search space;
receiving a physical DL shared channel (PDSCH) transmission comprising the SIB transmitted by the BS in the second BWP of the first carrier in accordance with a downlink assignment on the PDCCH.

7. A base station (BS) for handling system information (SI) change, comprising:
at least one storage device; and
at least one processing circuit, coupled to the at least one storage device, wherein the at least one storage device stores instructions, and the at least one processing circuit is configured to execute the instructions of:
broadcasting a plurality of synchronization signal (SS) blocks (SSBs) and a first SI block (SIB) periodically in a first bandwidth part (BWP) of a first carrier;
communicating with a first communication device in a second BWP of the first carrier;
transmitting to the first communication device a dedicated radio resource control (RRC) message configuring a physical downlink control channel (PDCCH) search space;
broadcasting a second SIB in the first BWP for transmitting a public warning system (PWS) message, after broadcasting the first SIB;
transmitting a PWS notification in the second BWP to the first communication device, to notify the first communication device to acquire the second SIB in the second BWP; and
broadcasting a PDCCH periodically in the second BWP in the PDCCH search space, to indicate the first communication device to receive a physical DL shared channel (PDSCH) transmission comprising the second SIB in the second BWP,
broadcasting the second SIB in the second BWP.

8. The BS of claim 7, wherein the first BWP and the second BWP belong to a cell of the BS.

9. The BS of claim 7, wherein the instructions further comprise:
transmitting the first SI change notification to a second communication device in the first BWP.

10. The BS of claim 7, wherein the PWS notification is transmitted in a specific message for the SI change notification.

11. The communication device of claim 6, wherein the instructions further comprise:
receiving a first SI change notification in the second BWP from the BS; and
receiving the PDSCH transmission comprising the SIB transmitted by the BS in the second BWP of the first carrier in accordance with the downlink assignment on the PDCCH, in response to the first SI change notification.

12. The communication device of claim 6, wherein the instructions further comprise:
receiving the dedicated RRC message in the first BWP or the second BWP from the BS.

13. The communication device of claim 6, wherein the PDCCH search space is common search space.

14. The communication device of claim 6, wherein the PDCCH search space is user equipment (UE) specific search space.

15. The BS of claim 7, wherein the instructions further comprise:
transmitting the dedicated RRC message to the first communication device in the first BWP or the second BWP.

* * * * *